H. P. BALL.
ELECTRIC WATER HEATER.
APPLICATION FILED MAY 17, 1911.
1,034,952.
Patented Aug. 6, 1912.
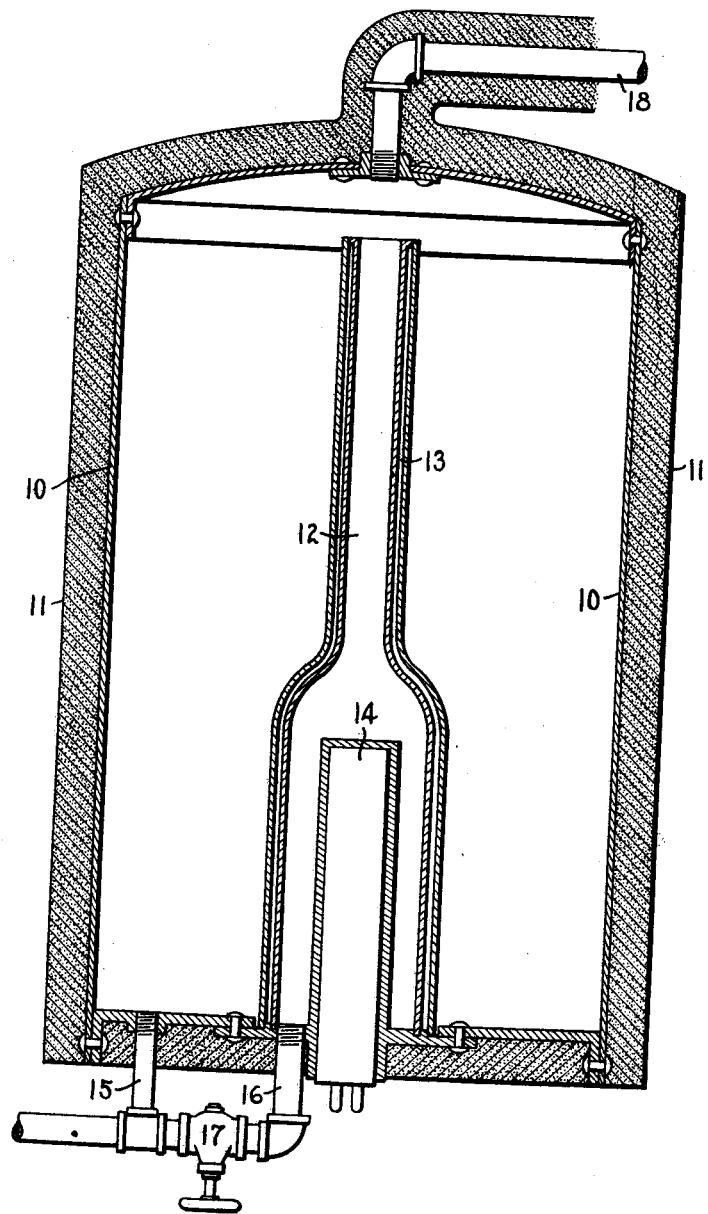
Witnesses:
Inventor
Henry P. Ball.
by
His Attorney.

UNITED STATES PATENT OFFICE.

HENRY PRICE BALL, OF PITTSFIELD, MASSACHUSETTS, ASSIGNOR TO GENERAL ELECTRIC COMPANY, A CORPORATION OF NEW YORK.

ELECTRIC WATER-HEATER.

1,034,952.  Specification of Letters Patent.  Patented Aug. 6, 1912.

Application filed May 17, 1911. Serial No. 627,744.

*To all whom it may concern:*

Be it known that I, HENRY PRICE BALL, a citizen of the United States, residing at Pittsfield, county of Berkshire, State of Massachusetts, have invented certain new and useful Improvements in Electric Water-Heaters, of which the following is a specification.

This invention relates to electric water heaters and has for its object the provision of a device of this character in which water or other fluid may be brought up to the desired temperature and rendered available for instantaneous use in a simple and efficient manner.

My invention relates more specifically to electric water heaters of the storage type in which a small quantity of heat is utilized for a relatively long time to gradually increase the temperature of a body of water. In devices of this character it is common to so arrange the parts that a small amount of water is brought to a high temperature almost instantaneously and may be drawn off at any time, the arrangement being such that a larger body of water is gradually heated from the smaller amount by circulation.

One of the objects of my invention is to improve this type of water heater so as to make the same more efficient in operation and at the same time more reliable and convenient.

Other objects of my invention will appear in the course of the following specification in which I have shown my invention in concrete form for purposes of illustration.

The accompanying drawing illustrates a sectional view of one embodiment of my invention.

From this drawing it will be seen that I have disclosed a water heater which is used on a closed system; that is, one which is connected with the water pressure, as, for instance, the city water mains. The object of the device is to gradually store up in a body of water the heat developed in a relatively small heating unit. This is done by having a heating element of small wattage connected to the circuit for a long time, or, if desired, it may be continuously in circuit. This will heat up a small quantity of water to a high temperature while at the same time a large quantity of water is being heated by circulation. The water receptacle in this case consists of a closed tank or receptacle 10 cylindrical in form. This tank is provided with a heat insulating covering 11 for preventing, as much as possible, any radiation of heat. Within this receptacle, and centrally thereof, I have provided a second casing 12 which forms an inner chamber communicating with the main body of the receptacle. This casing is also heat insulating in character. In this case, the casing is made to a large extent non-conductive of heat by making the casing double with an air space 13 between the inner and the outer portions of the casing. This casing is secured to the bottom of the receptacle and at its bottom portion is sufficiently enlarged to receive the heating unit 14 and still leave a clear space between the unit and the casing. The upper end of the casing is smaller and extends, as shown, to near the top of the receptacle. The supply pipe for this heater is connected with the main receptacle through the pipe 15 and also connected with the inner chamber 12 through the pipe 16. Between the pipe 15 and the pipe 16 there is a valve 17 which is arranged so as to offer a small orifice or opening for the circulation of water. The discharge pipe 18 is arranged at the top of the heater and in this case is directly over the mouth of the casing 13.

The operation of my device constructed as above described will be as follows: Assuming that the tank 10 is filled with water, the water in the chamber 12 will be brought to a high temperature by the electric heating unit 14. The heat of this water is not radiated through the casing 12 to any great extent but what does escape is conveyed to the water in the main receptacle. This is one of the distinct advantages in the particular arrangement of my heater. When the water in the inner chamber becomes heated it will circulate upward and into the main chamber. At the bottom the circulation will be from the main receptacle through the pipe 15, then through the small orifice 17 and pipe 16 into the inner chamber. There will be, therefore, a slow gradual circulation through the valve 17. The result will be that the inner chamber will contain hot water while the water in the outer chamber will not be so warm. When the discharge pipe 18 is opened to draw water, the hotter water in the upper part of the tank is first drawn off, since the warmer water will accumulate at the top.

Of course, if the current is left on long enough and no water drawn off, the water in the outer chamber will become substantially as warm as that in the inner chamber. As the water is drawn off through the discharge pipe, the cold water comes in through the pipe 15 to take its place. The valve 17, of course, is slightly open, but the orifice is small and the water will take the path of least resistance, so that the cold water will run into the outer receptacle. When no water is being drawn off, since the tank is full, no cold water will be taken in, but the circulation will go on from the inner to the outer chamber through the valve 17.

It will be seen that I have provided a simple and efficient form of storage heater in which the loss due to radiation is reduced to a minimum and in which a small wattage, used continuously, will heat a large quantity of water, while at the same time there will be a small quantity of hot water available at any time.

While I have described my invention as embodied in concrete form and as operating in a specific manner in accordance with the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is,—

1. An electric water heater comprising a closed receptacle for the water having a discharge pipe at the top, a heat insulated casing mounted on the bottom of said receptacle forming a chamber having an opening into the receptacle near the top thereof, a heating element in said casing, a supply pipe in the bottom of said receptacle, and a restricted passage between said supply pipe and the bottom of the chamber.

2. A water heater comprising a receptacle adapted to be filled with water under pressure greater than that of the atmosphere, a heat insulated chamber within said receptacle extending almost to the top of the same and communicating with the rest of the receptacle at the top thereof, a heating unit located at the bottom of said chamber, a discharge passage leading from the top of said receptacle, a supply passage leading to the bottom thereof and a supply passage leading from the said receptacle to the bottom of the aforesaid chamber.

3. A water heater comprising a receptacle adapted to be filled with water under pressure greater than that of the atmosphere, a heat insulated chamber of smaller horizontal cross section than said receptacle extending from the bottom of said receptacle almost to the top thereof and communicating with the said receptacle near the top thereof, an electrical heating unit located in the bottom of said chamber, a discharge pipe leading from the top of said receptacle, a supply pipe leading into the bottom thereof and a restricted passage leading from said receptacle to the bottom of the aforesaid chamber.

In witness whereof, I have hereunto set my hand this 12th day of May, 1911.

HENRY PRICE BALL.

Witnesses:
E. R. WANDS,
J. C. MUSGROVE.